US006183644B1

(12) United States Patent
Adams et al.

(10) Patent No.: US 6,183,644 B1
(45) Date of Patent: Feb. 6, 2001

(54) METHOD OF SELENIUM REMOVAL

(75) Inventors: D. Jack Adams, Park City; Timothy M. Pickett, Salt Lake City, both of UT (US)

(73) Assignee: Weber State University, Ogden, UT (US)

( * ) Notice: Under 35 U.S.C. 154(b), the term of this patent shall be extended for 0 days.

(21) Appl. No.: 09/503,135

(22) Filed: Feb. 11, 2000

Related U.S. Application Data

(60) Provisional application No. 60/119,866, filed on Feb. 12, 1999.

(51) Int. Cl.[7] ................... C02F 3/00; C02F 3/34
(52) U.S. Cl. .............. 210/611; 210/616; 210/911; 435/34; 435/252.8; 435/253.3; 435/262.5
(58) Field of Search ............ 210/611, 615–617, 210/620, 911, 912; 435/34, 244, 252.8, 253.3, 262, 262.5

(56) References Cited

U.S. PATENT DOCUMENTS

| | | | |
|---|---|---|---|
| 3,933,635 | 1/1976 | Marchant | 210/50 |
| 3,966,889 | 6/1976 | Kakuta et al. | 423/510 |
| 4,130,633 | 12/1978 | Shawl et al. | 423/509 |
| 4,222,999 | 9/1980 | Wier et al. | 423/557 |
| 4,330,508 | 5/1982 | Weir et al. | 423/42 |
| 4,374,808 | 2/1983 | Weir et al. | 423/42 |
| 4,377,556 | 3/1983 | Hofirek | 423/42 |
| 4,405,464 | 9/1983 | Baldwin et al. | 210/717 |
| 4,519,912 | 5/1985 | Kauffman et al. | 210/611 |
| 4,519,913 | 5/1985 | Baldwin et al. | 210/611 |
| 4,530,846 | * 7/1985 | Nagodawithana et al. . | |
| 4,725,357 | 2/1988 | Downing et al. | 210/611 |
| 4,752,394 | 6/1988 | Sood | 210/662 |
| 4,826,602 | * 5/1989 | Revis et al. . | |
| 4,915,928 | 4/1990 | Marcantonio | 423/510 |
| 4,935,146 | * 6/1990 | O'Neill et al. . | |
| 5,322,600 | 6/1994 | Spitz et al. | 204/151 |
| 5,352,608 | * 10/1994 | Kaplan et al. . | |
| 5,453,201 | 9/1995 | Etzel et al. | 210/668 |
| 5,487,834 | * 1/1996 | Carman et al. . | |
| 5,494,582 | 2/1996 | Goodman | 210/631 |
| 5,510,040 | 4/1996 | Miller et al. | 210/721 |
| 5,591,346 | 1/1997 | Etzel et al. | 210/668 |
| 5,601,721 | 2/1997 | Lukasiewicz et al. | 210/670 |
| 5,603,838 | 2/1997 | Misra et al. | 210/665 |
| 5,730,884 | 3/1998 | Kikuchi | 210/748 |
| 5,736,048 | * 4/1998 | Ibeanusi . | |
| 5,785,735 | 7/1998 | Raskin et al. | 75/711 |
| 5,833,855 | * 11/1998 | Saunders . | |
| 5,976,376 | * 11/1999 | Ogushi et al. . | |
| 6,033,572 | * 3/2000 | Yano et al. . | |

* cited by examiner

Primary Examiner—David A. Simmons
Assistant Examiner—Fred Prince
(74) Attorney, Agent, or Firm—Madson & Metcalf

(57) ABSTRACT

Dissolved selenium is removed from contaminated water by treating the water in a reactor containing selected endemic and other selenium reducing organisms. Microbes may be isolated from the specific water or imported from other selenium contaminated water, The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water.

27 Claims, 8 Drawing Sheets

| Carbon Source | Mine Water 1 ||||||||||||| Mine Water 2 |||||||||
|---|---|---|---|---|---|---|---|---|---|---|---|---|---|---|---|---|---|---|---|---|
| | P.stutzeri |||| A.xylosoxydans |||| Consortium |||| P.stutzeri |||| Consortium ||||
| | A | B | C | D | A | B | C | D | A | B | C | D | A | B | C | D | A | B | C | D |
| Water | | | | | | | | | | | | | | | | | | | | |
| dextrin | + | RR | + | R | | | | | + | + | | | + | RR | + | R | + | + | | |
| glycogen | + | RR | + | R | | | | | + | | w | w | + | RR | R | R | + | | R | R |
| tween 40 | + | RR | + | R | + | + | | w | + | R | w | w | + | RR | w | w | + | R | R | R |
| tween 80 | + | RR | + | R | + | + | | | + | R | | | + | RR | w | w | + | R | w | w |
| fructose | + | RR | | RR | | | | | | | + | | + | RR | R | R | | | R | w |
| galactose | | | | | | | | | + | + | | | | | | | + | + | | |
| glucose | + | RR | + | RR | | | | | + | + | + | | + | RR | + | RR | + | + | + | w |
| inositol | + | R | + | + | | | | | | | | | w | R | + | | | | | |
| lactose | | | | | | | | | + | | | | | | | | + | | | |
| maltose | + | R | w | R | | | | | + | + | + | | + | R | w | | + | + | R | R |
| mannitol | + | R | + | RR | | | | | + | | + | | + | R | w | R | + | | | |
| mannose | | | | | | | | | + | R | | | | | | | + | w | R | RR |
| sorbitol | | | | | | | | | + | | | | | | | | | | | |
| sucrose | | | | | | | | | | | | | | | | | | | | |
| methyl pyruvate | w | + | | R | + | w | | | w | w | | | + | w | w | | + | w | R | RR |
| mono-methyl succinate | + | + | | | + | + | + | + | + | R | + | + | w | w | | | + | R | R | R |
| acetic acid | w | w | + | + | + | + | | w | + | + | | | w | + | | | + | + | | |
| citric acid | + | R | + | R | + | + | | w | + | + | | | + | R | w | w | + | w | | |
| formic acid | | w | | w | | | | | | + | | | | + | | w | + | + | | |
| α-hydroxybutyric acid | | | | | w | w | | | w | w | | | | | | | w | + | | |
| lactic acid | + | + | + | R | + | R | | | + | w | | w | + | + | R | RR | + | w | + | w |
| malonic acid | w | + | + | R | | | | | | | | | w | w | w | | | | | |
| propionic acid | w | w | + | | + | + | | | w | + | | | w | w | + | + | + | + | | |
| alanine | w | R | + | R | + | R | w | R | + | R | | R | + | R | + | R | + | R | w | w |
| aspartic acid | + | RR | + | R | + | + | w | R | + | + | + | R | + | RR | w | w | w | w | w | w |
| glutamic acid | + | RR | + | RR | + | R | + | R | + | R | + | + | + | RR | + | R | + | R | w | w |
| glycerol | w | R | + | R | | | | | | | | | w | R | + | RR | | | | |

A - Normal saline (0.85%)
B - Normal saline (0.85%) plus 50 mg/L Se as sodium selenate
C - Normal saline (0.85%) made with waste water
D - Normal saline (0.85%) made with waste water plus 50 mg/L Se as sodium selenate Results Key:  Blank - no cell growth, no selenium reduction
w = light microbial growth/no reduction to elemental Se
+ = good microbial growth/no reduction to elemental Se
R = low to moderate reduction to elemental Se
RR = moderate to high reduction to elemental Se

Fig. 7

METHOD OF SELENIUM REMOVAL

RELATED APPLICATIONS

This application is related to and claims the benefit of U.S. Provisional Application Ser. No. 60/119,866, filed on Feb. 12, 1999 and entitled "Selenium Removal Bioprocess" which is incorporated herein by this reference.

BACKGROUND

1. The Field of the Invention

This invention relates to a method for removal of selenium from water. More particularly, this invention relates to the use of microbes for use in removal of selenium from water at a particular location containing selenium contamination.

2. Technical Background

Selenium is the thirtieth (30th) most abundant element. Selenium is a naturally occurring metalloid element having atomic number 34 and an atomic weight of 78.96. It lies between sulfur and tellurium in Group 16 and between arsenic and bromine in Period 4 of the periodic table of elements. Selenium is widely dispersed in igneous rock. In hydrothermal deposits, it is associated isothermally with silver, gold, antimony, and mercury. Selenium also appears in large quantities, but in low concentrations, in sulfide and porphyry copper deposits. Moreover selenium is widely associated with various types of sedimentary rock.

Inorganic selenium is most commonly found in four oxidation states ($Se^{6+}$, $Se^{4+}$, $Se^0$, and $Se^{2-}$). Selenate ($SeO_4^{2-}$) and selenite ($SeO_3^{2-}$) are highly water soluble. Elemental selenium ($Se^0$) is much less soluble in water. The most reduced form, hydrogen selenide ($H_2Se$) occurs as a toxic gas, but is readily oxidized to elemental selenium in the presence of air.

Elemental selenium can be oxidized to selenite by microorganisms or chemically oxidized in alkaline or mildly acidic conditions. Further oxidation of selenite results in the conversion to selenate. In highly oxidizing environments, such as well-aerated surface waters, especially those with alkaline conditions, the majority of selenium is present as selenate. The relative proportions of selenite and selenate depend on water redox potentials and pH. Selenite is reduced to elemental selenium under mildly reducing conditions while selenate reduction occurs under stronger reducing conditions.

Selenium forms covalent compounds with most other substances and is necessary in small amounts for most forms of life. Selenium is a chemical analog of sulfur and can interfere with normal cellular metabolism. Selenium is a teratogen in mammals and birds, contributing to birth defects in several species. Data related to selenium poisoning has been extensively published over the last decade. Selenium has been reported to cause death and/or mutations in fish and waterfowl. A highly publicized case of selenium poisoning occurred in California's Kesterson Wildlife Reservoir, resulting in its closure.

Selenium is a common water contaminant throughout the United States and the world and represents a major environmental problem in at least nine western states. Selenium contamination originates from many sources including mining operations, mineral processing, abandoned mine sites, petroleum processing, and agricultural run-off.

The principal sources of selenium contamination in mining are copper and uranium bearing ores and sulfur deposits. Selenium is commonly found in these mining wastewaters in concentrations ranging from a few micrograms per liter up to more than 12 mg/L. In precious metals operations, waste and process water and heap leachate solutions selenium may be present at concentrations up to 30 mg/L. While most of these mining operations are currently zero-discharge facilities, eventual treatment will be necessary to remove selenium to meet discharge and closure requirements.

Additionally, in many areas in the Western United States, natural background selenium concentration in irrigation drainwater and streams may exceed 2.0 µg/L. Selenium in irrigation drainwater has been a concern for the past two decades because of its adverse effect on aquatic life and waterfowl.

The National Primary Drinking Water Standard maximum containment level (MCL) for selenium is 50 µg/L and the maximum contaminant level goal (MCLG) is 50 µg/L. The current EPA National Ambient Water Quality Criteria, adopted as standards by most Western States for protection of aquatic life is 5.0 µg/L (chronic) and 20.0 µg/L (acute). However the U.S. Fish and Wildlife Service has suggested that these standards are inadequate, particularly with regard to protection of fish, waterfowl, and endangered aquatic species. Questioning of these standards has arisen because some laboratory and field studies indicate that water borne selenium concentrations as low as 2.0 µg/L may bioaccumulate in complex aquatic food chains to toxic levels.

Removal of selenium from large volume waters to meet discharge criteria is one of the nation's more complex environmental problems. Several methods have been investigated for treating agricultural wastewaters. These treatments generally involve the reduction of $SeO_4^{-2}$ to elemental selenium using either chemical reduction with ferrous hydroxide [$Fe(OH)_2$] or biological reduction using an indigenous bacteria. The chemical reduction method requires operating conditions that can be difficult to obtain in large treatment operations such as a pH of about 9 and a large excess of $Fe(OH)_2$. This method has proved to be too costly to sustain on a large scale.

Other treatment processes, such as lime precipitation, chemical reduction, activated alumina adsorption, ion exchange, reverse osmosis, electrodialysis, or distillation have been demonstrated to remove a variety of pollutants including selenium from water to below drinking water standards. However, these methods are generally expensive and cost prohibitive for the treatment of large volumes of water.

Moreover, lime precipitation and chemical reduction processes can result in a mixed metal waste product that can increase treatment and disposal costs, and generally require some pH adjustment of the influent. Additionally, laboratory tests and pilot plant studies have shown that chemical precipitation employing alum, lime, ferrous sulfate or ferric sulfate are substantially ineffective for removing selenium in the selenate oxidation state.

A process for the removal of selenium from waters using a reactor containing microbial biomass has been investigated. However, this method is inadequate because it is intended to treat water that contains at least 0.5 mg/L of selenium and is only capable of lowering the selenium concentration to 10% of the original value. In order to achieve the drinking water standard, a polishing step such as ion exchange is needed. Additionally, this method is inhibited by anions such as nitrate and sulfate.

Generally, selenium containing waters greatly differ from each other in type of selenium contamination, levels of selenium, types of co-contaminants, levels of co-contaminants, pH, ionic content, etc. These factors make the bioremediation of selenium containing waters complex and some what site-specific.

From the foregoing it will be appreciated that it would be a significant advancement in the art to provide a low-cost method of removal of selenium contamination from water. It would be a further advancement to provide a method that would remove selenium contamination to below the MCL. It would be an additional advancement to provide a method that would economically remove selenium concentrations to below drinking water standards. It would be an further advancement in the art to provide a method that could remove both selenate and selenite. It would be a further advancement to provide a method that could remove selenium in concentrations ranging from below 0.5 mg/L to greater than 100 mg/L. It would be a further advancement to provide a method of bioremediation that could remove selenium from widely varying waters. It would be a further advancement in the art to provide a method of bioremediation that could remove selenium from widely varying waters using retention times ranging from 4+.24 hours.

Such methods of selenium removal are disclosed herein.

BRIEF SUMMARY OF THE INVENTION

The present invention provides a method for reducing oxidized selenium and removing the selenium contamination from water. The method is not limited to a specific type of wastewater and can be used with industrial, mining, and agricultural waters. Moreover, the method may be used to optimize selenium removal at any given site.

One step of the method of the present invention is to isolate endemic microbes from the selenium contaminated water. These microbes are then screened along with other known selenium reducers for their ability to reduce selenium under site-specific conditions. The microbes are also screened for their potential to interfere with selenium reduction. The endemic and other selenium reducing microbes may include Pseudomonas species, Alcalaqines species, *E. coli,* and sulfate reducing bacteria.

Cultures of selenium reducing microorganisms are selected and optimized for selenium reduction and growth in a bioreactor or in some cases, in situ application. The optimized cultures are selected on contaminant reduction parameters and required nutrient amendments. A high-density biofilm of the selected organisms is established within the reactor or in situ environment. The reactor may be a single chamber bioreactor or have a series of reactors connected together.

As the organisms grow within the reactor a nutrient mix can be supplied to maintain optimal selenium reduction. In one presently preferred embodiment, the nutrients may include mixes of sugars, whey, waste food products, protein mixtures, yeast extract, phosphate and other vitamins and minerals. Under certain environmental conditions the selenium reduction may be optimized with sugar mixtures or waste food products and other vitamins and minerals at concentrations ranging from 0.25 g/L to 5.0 g/L and a phosphate concentration of about 50 mg/L.

The selenium contaminated water passes through the reactor along with the nutrient mix. The water is retained in the reactor for a period of about 4 hours to about 24 hours. In certain embodiments the retention period may be short, for example from about 4 to about 8 hours. In certain other embodiments the retention period is from about 12 to about 24 hours.

The method of the present invention is capable of reducing both selenate and selenite to elemental selenium. As the elemental selenium forms it precipitates from the solution. The precipitate may be removed in a variety of solid/liquid separation methods such as flushing, back flushing, agitation, separation in a hydrocyclone, and tangential filtration. Elemental selenium is a valuable substance and may be sold on the open market, thus recovering some of the costs of the removal process.

The reactor or reactors contain a matrix for establishing a biofilm thereon. Various materials may support the biofilm including gravel, charcoal, pumice, continuous-release microbe-containing agar based beads, a mixture of biosolids, carbon/agar-based matrices, and combination thereof. Other types of biofilm establishment are within the knowledge of those skilled in the art.

A method for screening microbes for selenium reduction is also presented. Microbes are first isolated from a selenium-contaminated environment. The isolated microbes are characterized according to colony morphology, gram stain, and metabolic profiles. Microbes are then incubated in a nutrient selected solution containing selenium. The solution is then in turn analyzed for selenium reduction.

Microbes for use at a specific site once selected based on endemic and other selenium reducing microbes, endemic non-selenium reducing microbes, growth and selenium reduction in site waters, and utilization of economical nutrient mixtures.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 7 is a comparison chart of microorganisms and nutrient for selenium reduction in two mine waters;

DETAILED DESCRIPTION OF THE INVENTION

Figure 1:
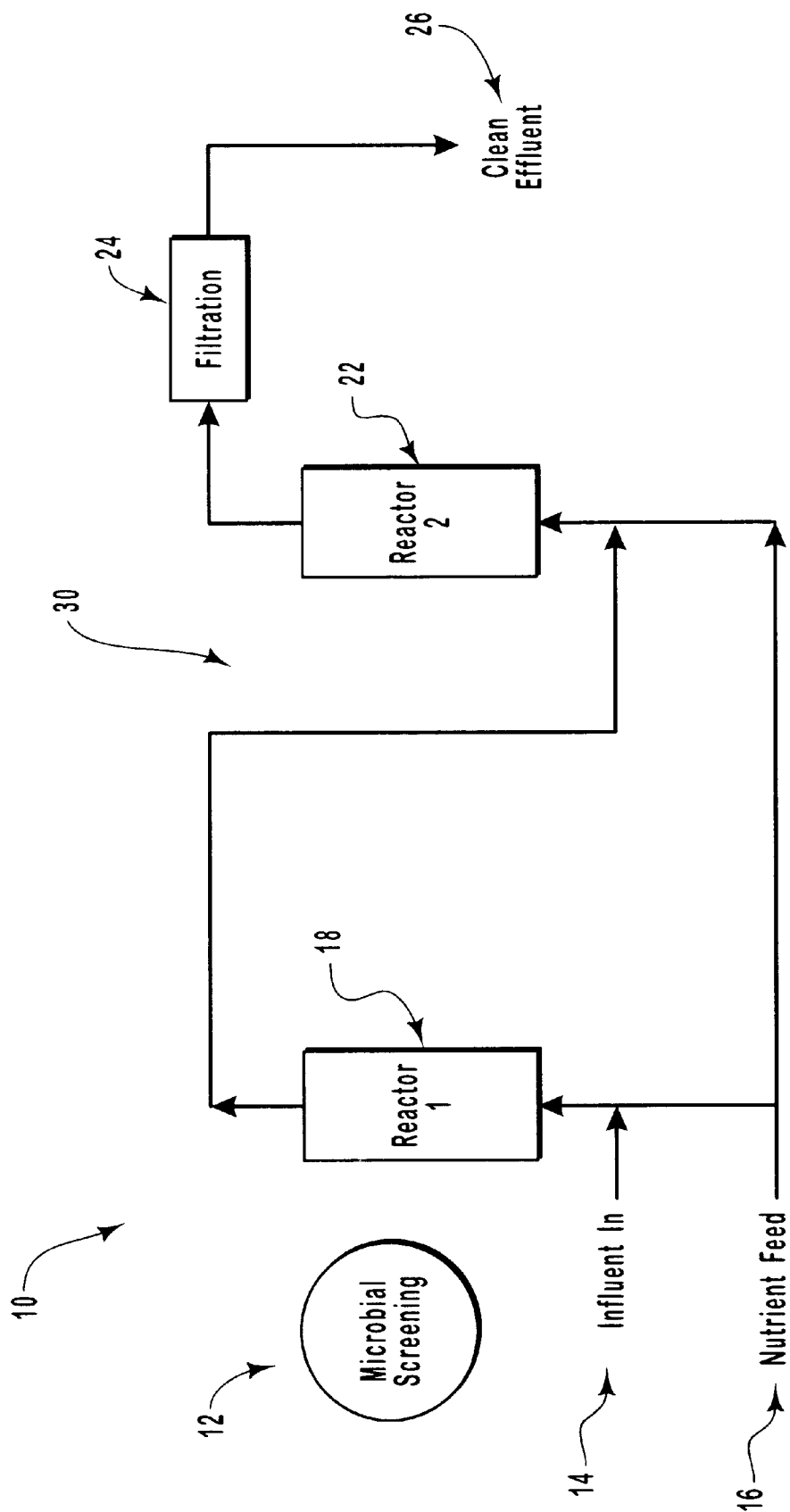
FIG. 1 is a schematic representation of a bioreactor consistent with one embodiment of the present invention.

It will be readily understood that the components of the present invention, as generally described and illustrated in the Figures herein, could be arranged and designed in a wide variety of different configurations. Thus, the following more detailed description of the embodiments of the method of the present invention, as represented in FIGS. 1 through 9, is not intended to limit the scope of the invention. The scope of the invention is as broad as claimed herein. The illustrations are merely representative of certain, embodiments of the invention. Those embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only as an example, and simply illustrates embodiments that one consistent with the invention as claimed.

A process for removing selenium from aqueous streams including industrial process wastewater and agricultural runoff is described. Laboratory and field testing of numerous process solutions containing from less than 0.05 to 33.0 mg/L selenium has produced effluents to meet drinking water criteria and field discharge criteria. The technology uses enhanced site-specific custom microbial cultures combined with selected indigenous selenium-reducing bacteria to economically remove selenium.

The processes of this invention make it economically feasible to significantly reduce the selenium level in industrial process and wastewaters, agricultural waters, and other drinking waters. The process can be configured to operate in anaerobic or micro-aerophilic conditions under either of two regimes: (1) a process configured to remove up to 97% of selenium from waters/solutions containing high levels of selenium using low (4 to 8 hr) retention times; and (2) a process configured to remove selenium to drinking water criteria using longer (12 to 24 hr) retention times.

The invention uses enhanced site-specific custom microbial cultures and indigenous selenium-reducing bacteria, to economically remove selenium. The process will operate in anaerobic or micro-aerophilic conditions. Key features of the reactor system are: (1) screening indigenous and other selected microbes for selenium reduction under expected environmental conditions; (2) establishment of the selected microbial population, based on metabolic profiles, as a high density biofilm on reactor media; (3) operation of the reactor using dissolved oxygen levels, redox conditions, and solution retention times as determined in the screening tests; and (4) using a separate nutrient feed stream based on metabolic profiles and selenium reduction tests. for each staged reactor.

A site-specific optimization is an essential component of bioprocess development in order to achieve economical removal efficiencies at realistic retention times and operating costs. The end results of this bioprocess optimization is the development of a site-specific microbial cocktail, confirmed to efficiently and economically remove selenium to below site target criteria using actual site waters using retention times of about 4 to 24 hours. This optimized microbial cocktail consists of site-endemic, and other naturally occurring, non-pathogenic microbes, including previously tested Pseudomonas species. MIDI fatty acid profiles were generated for all selected microbes in order to track the population through bioprocess implementation.

Overall, nutrient costs are a primary contributor to the long-term operating costs of any heterotrophic bioprocess. Nutrient costs can be reduced with through careful microorganism selection, nutrient optimization, and attention to bioreactor microbial density. The result of this biotreatability testing indicates that efficient selenium reduction can be obtained with an inexpensive molasses based nutrient. As determined in laboratory and field tests, estimated operating cost for a sugar-based or waste food products-based nutrients biological selenium reduction process are anticipated to be as low as $0.35–$0.50/1000 gallons.

Referring to FIG. 1, a simplified schematic representation of a two-stage anaerobic bioreactor system 10 that would have a retention time of 18 to 24 hours is presented. Laboratory and field-testing of numerous process solutions containing from less than 0.05 to 33.0 mg/L selenium has produced effluents to meet drinking water criteria (10 $\mu$g/L).

Because selenium contaminated waters are complex and differ significantly in selenium concentration and other environmental factors, a microbial screening 12 step allows the method to be employed with any selenium-contaminated water. At this step microbes are screened allowing for the selection and establishment of the optimal microbial mix to perform the selenium conversion and subsequent removal from the water. Microbes are further screened in order to minimize anion interferences such as nitrate and sulfate, and maximize selenium removal kinetics.

Initially, site water is screened for endemic selenium-reducing microbial cultures, and non-selenium reducers, which could possibly interfere with selenium reduction. Other non-endemic microbes are also screened for their ability to reduce selenium under environmental conditions. Cultures are selected on their ability to reduce selenium under environmental conditions, their metabolic profiles that will minimize nutrient costs, and to minimize over growth by endemic non-selenium reducers. Selected cultures are optimized for selenium reduction through determination of selenium reduction parameters and required nutrient amendments.

After initial screening/optimization, the desired microbial population is established as a stabilized biofilm on the reactor media within the reactors 18, 22. Selenium containing water is passed through the bioreactor 30 containing a select population of suspended and immobilized biofilm microorganisms. Nutrient feed 16 is supplied at each of the reactors 18, 22. In certain embodiments of the invention, the nutrient feed 16 includes nutrient bases composed of agricultural grade sugars and/or waste food products or protein mixes supplied at a concentration of about 2.0 g/L and supplemented with appropriate vitamins and minerals. The nutrient feed 16 may also contain yeast extract and/or phosphate may at a concentration of about 50 mg/L.

The reactors 18, 22 contain a matrix suitable for sustaining high concentrations of microbes. The matrix may include such materials as gravel, charcoal, continuous-release microbe-containing agar beads, and a mixture of bio-solids, and carbon/agar, or other porous materials.

As the microbes reduce the selenite and selenate, insoluble elemental selenium precipitates. The elemental selenium may either be retained within the reactor or removed by a solid/liquid separation, flocculation/settling, filtration, step 24 such as flushing, tangential (cross-flow) filtration, and hydrocyclone. The specific particulate selenium removal step depends on the water chemistry and the microbes selected for selenium reduction. The resulting effluent 26 contains levels of selenium reduced to below drinking water criteria or other desired discharge criteria.

EXAMPLES

The following examples are given to illustrate various embodiments, which have been made within the scope of the present invention. It is to be understood that the following examples are neither comprehensive nor exhaustive of the many types of embodiments, which can be prepared in accordance with the present invention.

Example 1—Sample Collection

Samples were collected using sterile high-density polyethylene (HDPE) containers to optimize site microbial survival and minimize outside contamination, and were filled so that no air remained in the bottle after capping. All samples were alphanumerically labeled, logged into the microbial logbook, and stored at 4° C. until plated for counts of total heterotrophs and selenium reducers, and individual microbial isolation.

Example 2—Dissolved Metals, Selenium pH, and REDOX Analysis

Metals and selenium concentrations were measured by Inductively Coupled Plasma Spectroscopy (ICP) and Atomic Absorption Spectroscopy (AA) analysis. Selenium analysis, conducted by EPA certified laboratories, used 15 to 25 ml of filter sterilized (Nalgene 0.2 $\mu$m) samples were preserved with nitric or hydrochloric acid and stored at 4° C. until analyzed. Total selenium and selenite were determined using a hydride generation AA procedure. Selenite was determined directly by hydride generation. Total selenium was determined by oxidizing all selenium in the sample to selenate in a potassium persulfate-nitric acid digestion followed by reduction to selenite with HCl. Selenate was calculated as the difference between total selenium and selenite. Dissolved metals concentrations were determined, via ICP analysis.

The pH of the reactor feed and effluent streams was measured via a membrane electrode. The pH meter was calibrated using buffer solutions such that the calibrating solution pHs bracketed the expected pH as close as possible. If the expected pH was 9.0, the buffer solution of pH 7.0 and 10.0 was used for calibration. The REDOX was measured with a calibrated platinum electrode. The calibration procedures were conducted for every measurement set and measurements were carried out under anaerobic and aerobic conditions.

Example 3—Microbial Isolation and Characterization and Selenium Reduction Screening All samples were stored in a 4° C. Refrigerator to inhibit microbial growth until analysis. Before samples were tested they were allowed to warm to ambient temperature and vortexed to ensure a representative sample for plating. Plate counts were obtained using the standard laboratory procedure using 0.2 ml initial sample volume.

The baseline microbial characterization portion of the testing included microbial isolations and plate counts. Microbial isolations were performed on trypticase soy agar (TSA) using the streak plate method. All culturing was performed in a Class II Laminar Flow hood. Isolates were initially characterized by colony morphology and gram stain, and isolates were slanted on appropriate media for future testing. Microbial counts were performed on the provided waters using the standard plate count method. Samples with low numbers of organisms present in the sample were concentrated 1:50 using centrifugation to get an accurate plate count. Plate counts were reported in colony forming units (CFU)/ml. Selected site isolates were further characterized by green stain metabolic profiling, and by MIDI fatty acid analysis.

Endpoint qualitative, and quantitative selenium reduction assays were utilized as screening tools to assess selected microbial strains and microbial support materials for selenium reduction using various supplementary nutrients. The selenium test water used for the screening series consisted representative site waters. Screening tests used log-phase microbial cultures at a concentration of greater than $2\times10^8$ cells per ml prepared in trypticase soy broth (TSB), washed and re-suspended in sterile saline, and inoculated into 15-ml culture tubes containing selenium test water and or selected nutrient(s) at a concentration of $2\times10^9$ cells per ml. Nutrient-selenium containing media without microorganisms and selenium containing media without nutrients were used as controls. Tubes were incubated in both aerobic environments and a Coy anaerobic chamber at room temperature for 24 to 48 hours, and then evaluated for selenium reduction.

Figure 3:
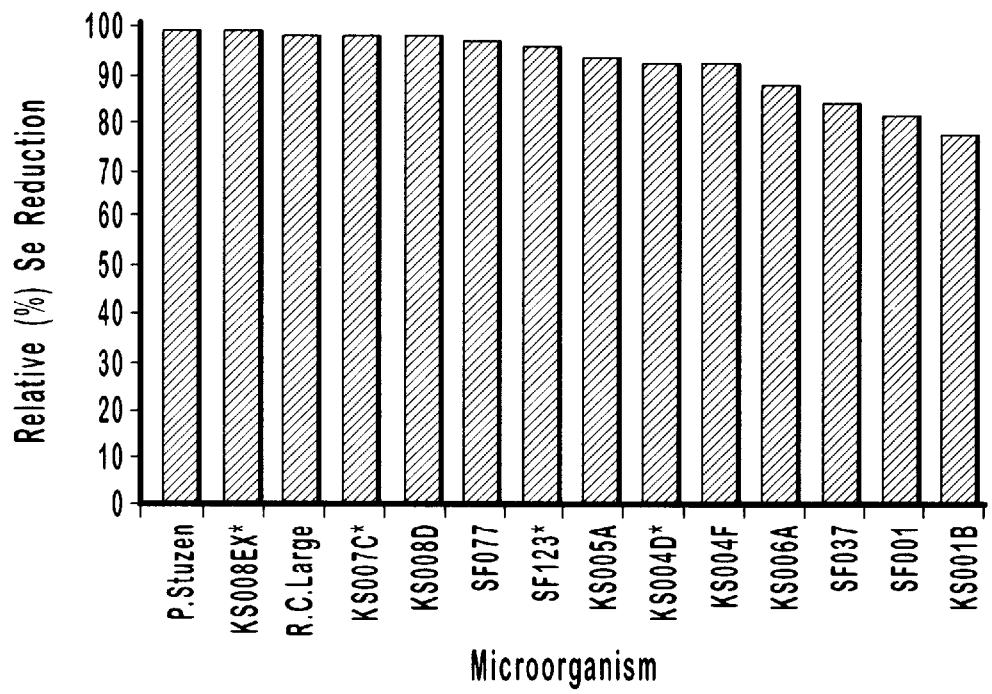
FIG. 3 illustrates the effect that site waters have on selenium reduction.

Over 48 heterotrophic microorganisms were isolated from nine separate representative site samples. Eighteen of these microbes were capable of reducing selenium in laboratory prepared selenium solutions used to select and screen selenium-reducing microbes. In addition, several previously collected selenium-reducing Pseudomonas species, and other species and strains were selected based on their original source of isolation (high selenium containing mining and industrial process waters) and their ability to perform a reduction on other oxyanionic contaminants. All isolates tested are naturally occurring, non-pathogenic facultative anaerobes. Isolates that reduced selenium to below 95% in this screening, were subsequently tested in site waters containing ~2.0 mg/L selenium for their ability to reduce selenium. Tests were conducted in 15 ml tubes under static conditions at ambient temperature for seven days. Referring to FIG. 3, results of this screening demonstrate the effect that site waters have on selenium reduction.

Microbes were characterized through plating samples, noting colony morphology, gram stains, metabolic profile analysis, followed by testing selected microbes for their ability to reduce selenium in various economical nutrients.

Figure 4:
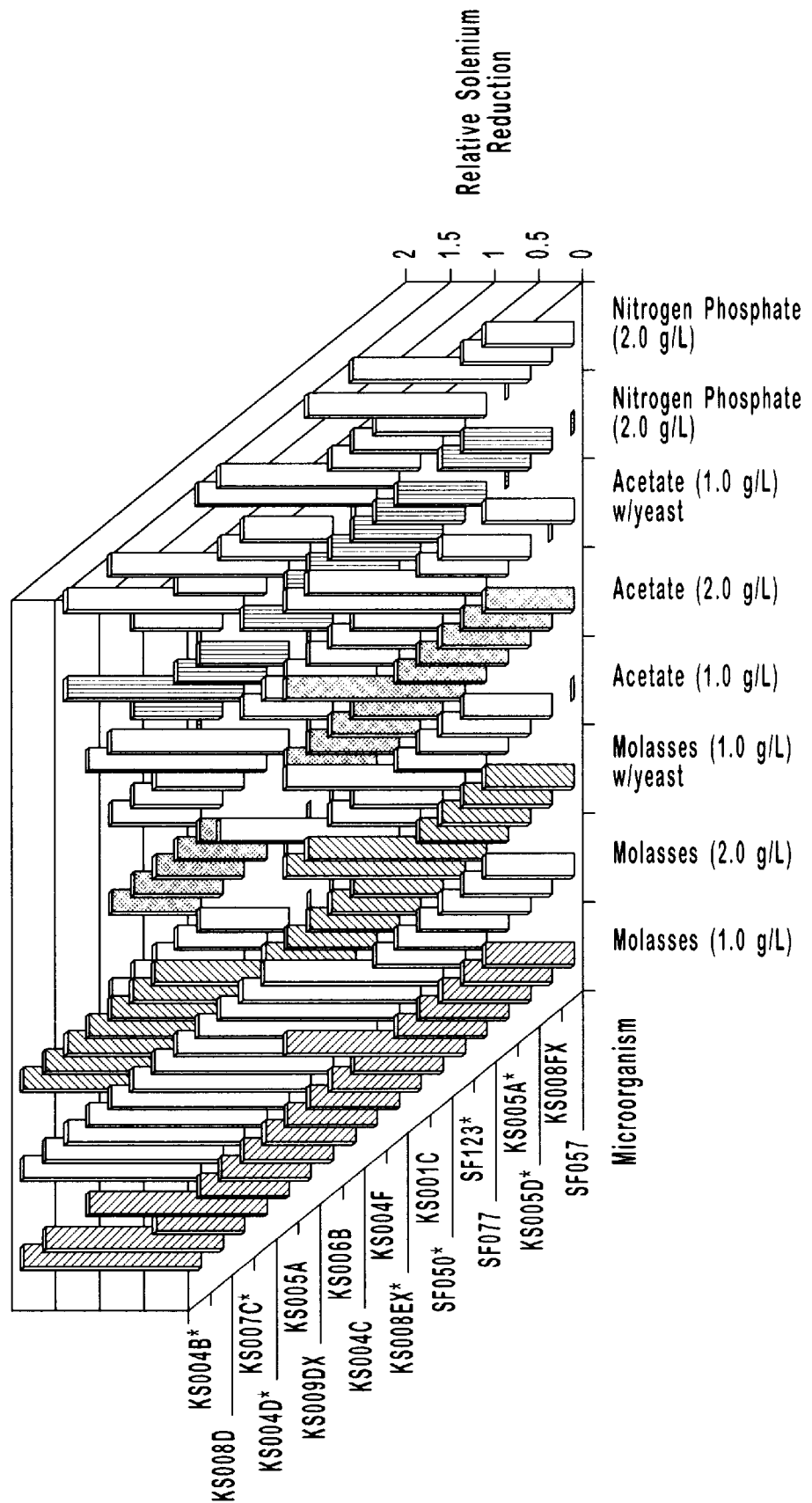
FIG. 4 illustrates the effectiveness of certain nutrients for selenium reduction.
Figure 5:
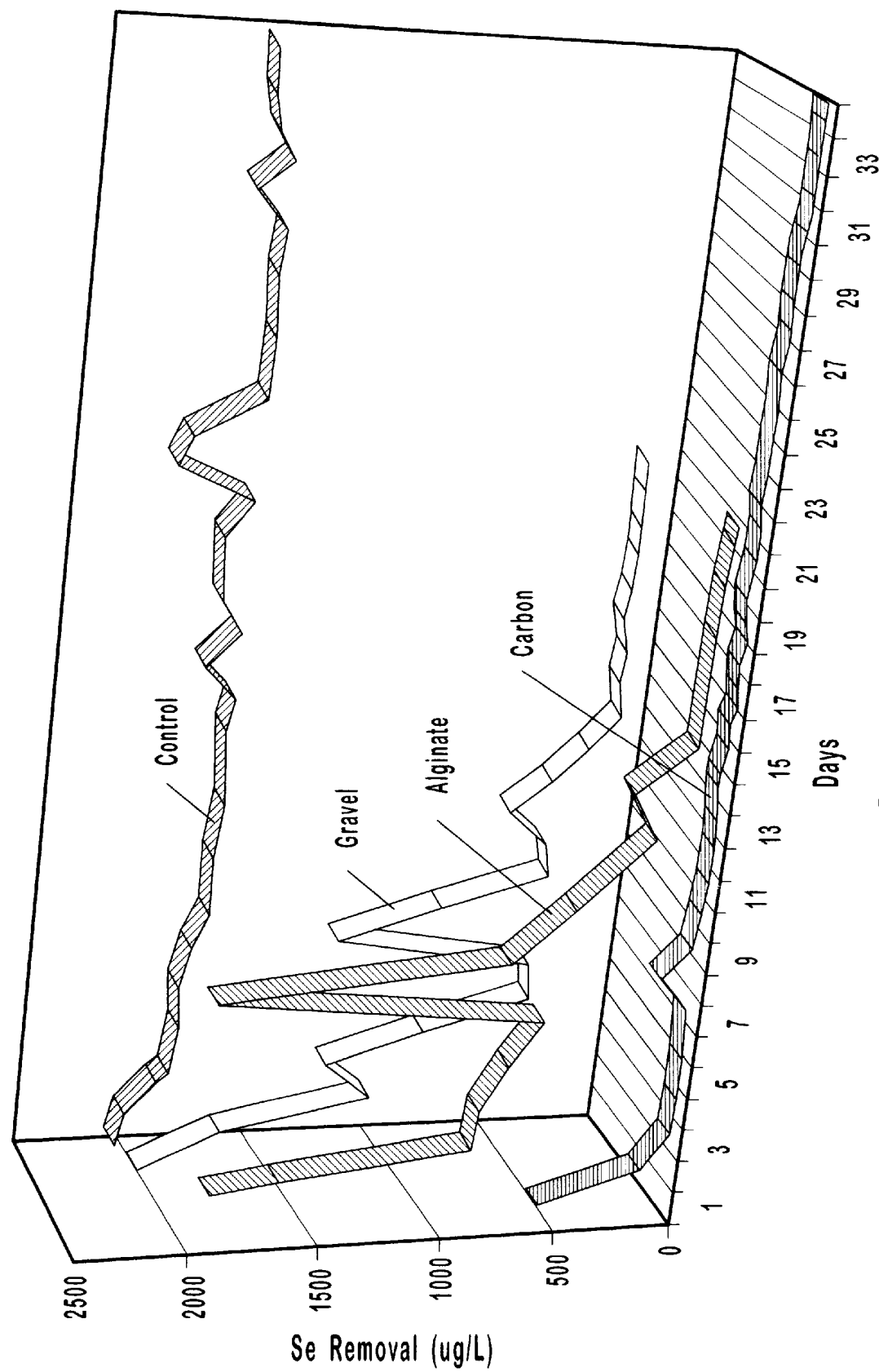
FIG. 5 illustrates the effectiveness of biomatrices for sustaining effective selenium reduction.

Microbes were grown for 24 hr in 50 ml culture tubes containing TSB at ambient temperature followed by subsequent dilution or concentration to an OD of 0.800 (cell density of $8.0\times10^8$/ml greater than $2.0\times10^8$/ml. The cells were washed with saline, resuspended in site waters with selected nutrients, and incubated at ambient temperature for six days. FIG. 4 shows the effectiveness of selected nutrients for selenium reduction in site water. In the site waters tested for this example, molasses and molasses-based nutrients were shown to be most effective for selenium reduction by site and other selected microbes. A molasses-based nutrient at about 1.0 g/L with yeast at about 0.25 mg/L were shown to be the most economical combination with good selenium reduction. Top performing microbes from this screening were selected for bioreactor testing.

Example 4—Bioreactor/Bioprocess Tests

Microbial support materials evaluated for selenium-reduction at the site included gravel, coconut charcoal screened to +8 mesh, and continuous-release microbe containing agar-based beads. Controls were used to determine possible sorption of dissolved selenium to materials used in the proposed testing. Sorption tests were conducted with biofilm support materials (50% by volume to approximate reactor conditions) under static conditions at ambient temperature for 2,4, and 8 hr. Tests used pre-wetted biofilm support materials, 25–100 ml of actual process water.

Two sets of anaerobic up-flow bioreactors were used to evaluate preliminary biological selenium reduction operating parameters and economics, retention time, flow rate, system kinetics, nutrients, and overall system performance. All tests were conducted in one-inch diameter columns operated in single-pass, up-flow mode with retention times ranging from 6 to 24 hr, at ambient temperature. The bioreactors used a defined microbial cocktail of Pseudomonas and other site bacteria to provide scale-up estimates for pilot-scale application. Controls used carbon, slag, agar-based beads, biosolids and other biofilm support materials without microorganisms.

Reactors tested used agar-based beads configured to evaluate microbial cocktail compositions in the following process $(SeO_4^{2-}) \rightarrow (Se^0)$, gravel, and activated carbon. Gravel and carbon reactors were treated to enhance biofilm establishment and then inoculated with the top performing microorganisms, FIG. 5. Reactors were inoculated in a manner to ensure establishment of this microbial cocktail as the predominant microorganisms in the reactors. After a brief conditioning time, the carbon and agar-based bead reactors were removing selenium to well below target levels; reaching low microgram to non-detectable levels. Some low-level microgram selenium spikes were observed that were probably due to elemental selenium migrating through the reactors. Since the reactor effluent collection vessels were open to the atmosphere, the elemental selenium was dissolving before the filtration step conducted every 24 hrs. Keeping the effluent collection flasks in an anaerobic environment will most likely prevent these low-level spikes. Control reactors consisted of agar-based beads, gravel, and carbon without microorganisms.

Example 5—Determination of Optimal Microbe and Nutrients

Figure 6:
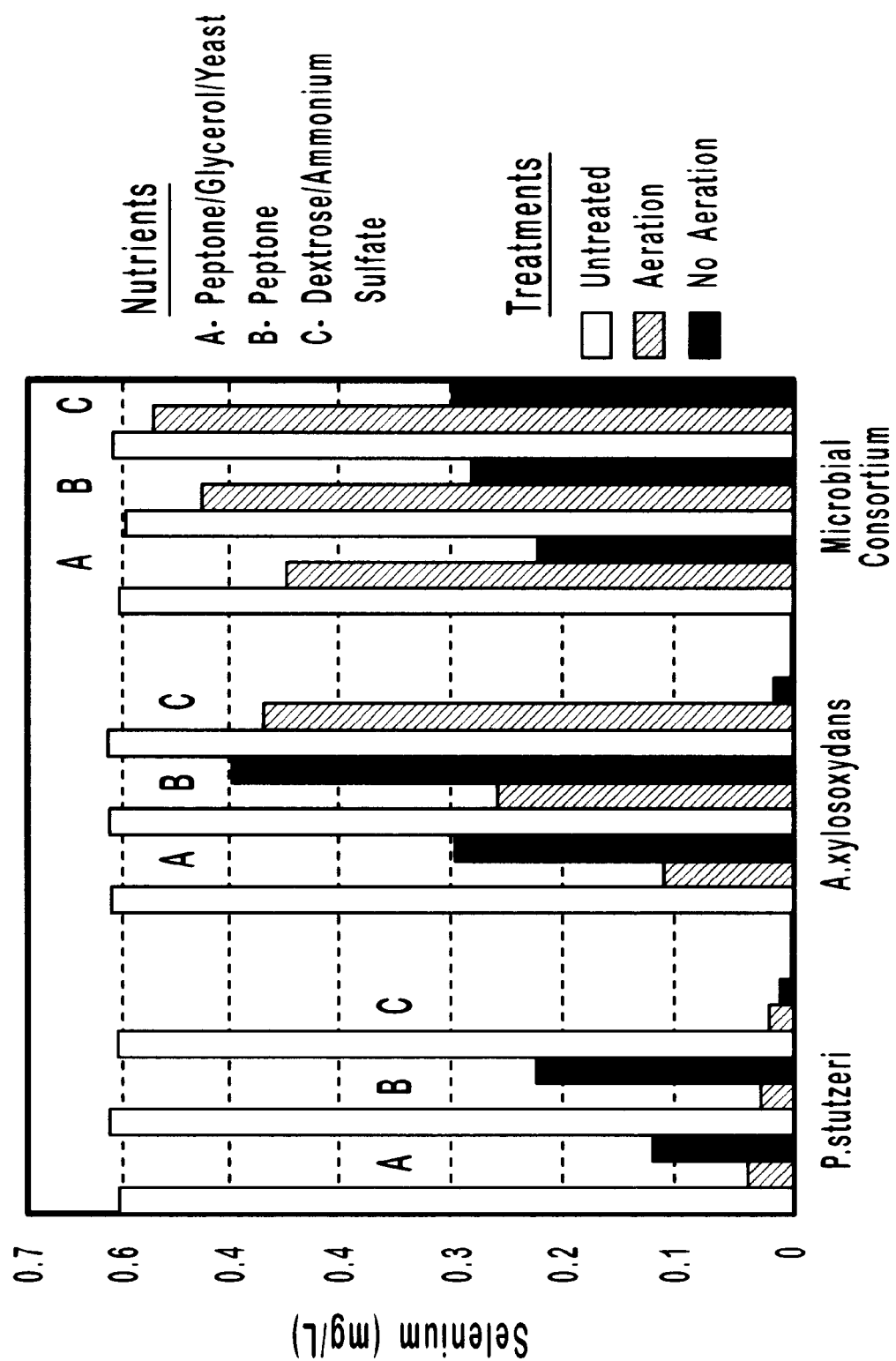
FIG. 6 is a graph illustrating selenium removal by different microbes with varying environmental conditions.

Referring to FIG. 6, a comparison of selenium removal by different microbes, nutrients, and aeration levels in mine water containing 0.62 mg/L selenium at pH 7.96 is presented. Tests used 250 ml Erlenmeyer flasks containing 50 ml of filter sterilized wastewater and a 10-fold dilution of log phase microbial cells ($2.0 \times 10^8$ cells/ml) as an inoculum. Optimum aeration levels depend on the microorganism, mining water, and nutrient supplement. Under conditions of aeration (shaker flasks- 125 rpm) peptone-glycerol-yeast (PGY) and peptone supplements with *P. stutzeri* and *A. xylosoxydans* resulted in significantly lower selenium levels than did ammonium sulfate and dextrose supplements. However, when oxygen levels were low (static flasks), the ammonium sulfate and dextrose supplement performed best. Selenium reductions to $\leq 0.02$ mg/L were achieved with *P. stutzeri* and *A. xylosoxydans*. The microbial consortium, containing *A. xylosoxydans*, produced less dramatic results. Additional quantitative assessments of selenate and selenite reduction by *P. stutzeri* and other isolates were performed in peptone based media containing 10.0 mg/L selenium and incubated at 24° C. with shaking at 125 rpm. Stoichiometric reductions of selenate and selenite were observed during late log and early stationary phases of cell growth.

Example 6—Inhibition of Selenium Reduction by Certain Anions

Microbes were screened in a peptone medium (pH 7.6) to investigate inhibition of selenium reduction by nitrate, nitrite, sulfate, and sulfite. The results of this screening are shown in Table 1. Data for two microorganisms are presented. Various microorganisms were incubated in triplicate on a rotary shaker (125-rpm) at 25° C. in flasks containing initial selenium concentrations of 50 mg/L. Selenate and selenite reduction by various microbes was inhibited to different degrees by the anions. It was observed that anion inhibition of *P. stutzeri* selenate or selenite reduction was microorganism and microbial isolate dependent; only slight inhibition was observed with some isolates.

TABLE 1

| Microorganism | Selenium Species | Anion | Concentration (M) | % Decrease in Se Reduction |
|---|---|---|---|---|
| *E. coli* | $SeO_3^{2-}$ | $SO_4$ | $10^{-2}$ | 6 |
| | | $NO_3$ | $10^{-2}$ | 37 |
| | | $NO_2$ | $10^{-2}$ | 43 |
| | | $SO_3$ | $10^{-3}$ | 45 |
| *E. coli* | $SeO_4^{2-}$ | $SO_4$ | $10^{-2}$ | 8 |
| | | $NO_3$ | $10^{-2}$ | 17 |
| | | $NO_2$ | $10^{-2}$ | 22 |
| | | $SO_3$ | $10^{-3}$ | 67 |
| *P. stutzeri* | $SeO_3^{2-}$ | $SO_4$ | $10^{-2}$ | 1 |
| | | $NO_3$ | $10^{-2}$ | 9 |
| | | $NO_2$ | $10^{-2}$ | 5 |
| | | $SO_3$ | $10^{-3}$ | 85 |
| *P. stutzeri* | $SeO_4^{2-}$ | $SO_4$ | $10^{-2}$ | 3 |
| | | $NO_3$ | $10^{-2}$ | 1 |
| | | $NO_2$ | $10^{-2}$ | 3 |
| | | $SO_3$ | $10^{-3}$ | 10 |

Example 7—Comparison of Selenium Reduction by Microbes on Two Mine Waters

Referring to FIG. 7, the data obtained from studies comparing selenium reduction in the presence of mine waters 1 and 2, containing 1.48 and 6.2 mg/L selenate, respectively, different carbon sources, and microorganisms are presented. *A. xylosoxydans* and the microbial consortium were indigenous to mining water 2, while *P. stutzeri* was not indigenous to either mining water. None of the organisms were indigenous to mining water 1. Cell growth and numbers were approximately equal when added to the different carbon sources and mine water 1 at pH 7.9 and mine water 2 at pH 9.2. All microbes were used from cultures in log phase and microbial concentrations were at $2 \times 10^8$ or greater after dilution. Three replicate samples were tested, without aeration, at 24° C., for 24 and 36 hr with the listed carbon source and additives. Selenium reduction by a particular microbe or consortia of microorganisms has distinct optimum and of ten different nutrient requirements.

Example 8—Selenium Reduction

Figure 8:
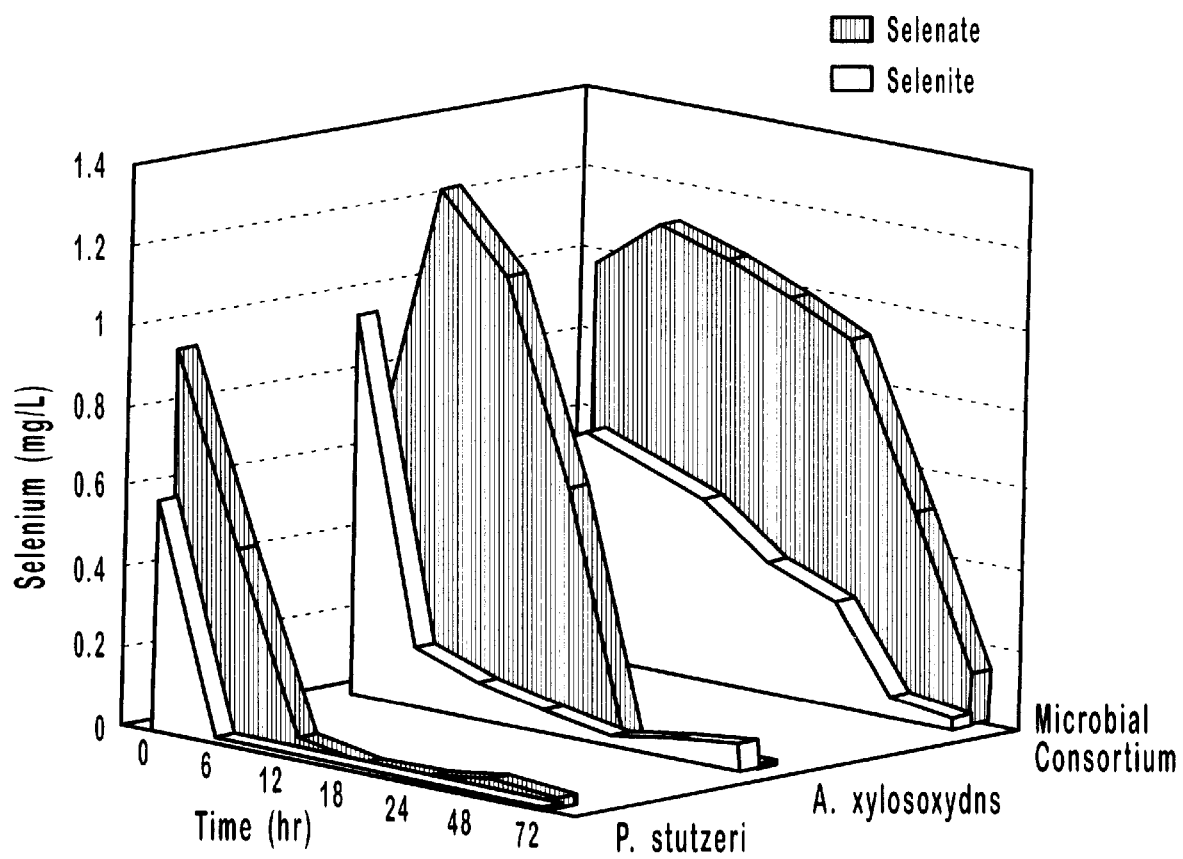
FIG. 8 is a graph illustrating selenium reduction by various microbes over time.

Referring to FIG. 8, selenium reduction by the microorganisms used in FIGS. 6 and 7 is illustrated. Dextrose and ammonium sulfate (1 g/L each) nutrients were added to mine water 1. All microbes were used from cultures in log phase and microbial concentrations were approximately $2 \times 10^8$ or greater after dilution. In cultures started with a 10-fold dilution of cells in late log phase, the reduction to elemental selenium was complete within 6 to 18 hr. Generally, with higher cell dilutions of 50 or 100 fold, reduction to elemental selenium required 24–36 hr and 36 to 72 hr, respectively.

Example 9—Bioreactor System to Treat to Below Drinking Water Criteria

Figure 2:
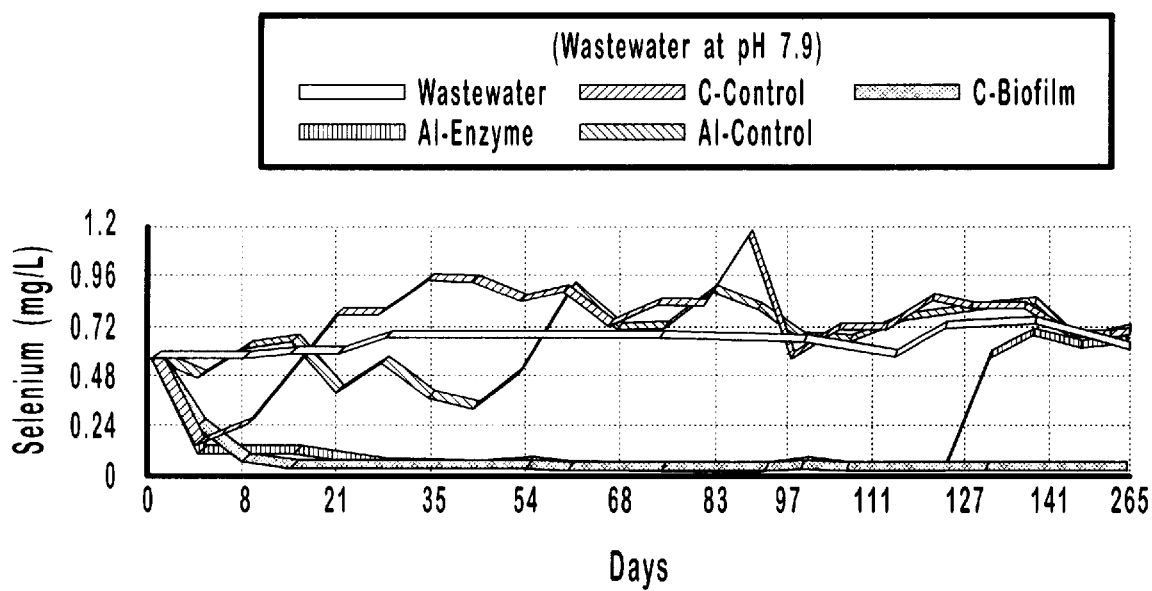
FIG. 2 illustrates selenium reduction with a biofilm on activated carbon.

Referring to FIG. 2, a bioreactor system was configured to remove selenium from various waters to below drinking water criteria (0.01 mg/l). Enhanced biofilms of *P. stutzeri* have been developed on surfaces by pretreatment of the support material with selected biopolymers. Biofilms established in such a manner have supported single microbes and microbial consortia for selenium reduction for periods up to nine months using enhanced/immobilized biofilms of *P. stutzeri* using a mine water containing 0.62 mg/L selenium as selenate. Tests used a single-pass bioreactor with a retention time of 18 hr. The enhanced biofilm preparation removed selenium to below 0.01 mg/L for nine months without the addition of supplemental nutrients.

Example 10—Bioreactor for Treating High Levels of Selenium with a Short Retention Time A bioreactor system was configured to treat waters containing high levels of selenium using short retention times. A bench-scale study was conducted in which an *E. coli* isolate was used to treat a smelter, weak acid effluent containing more than 33 mg/L selenium. A rotating biological contractor (RBC) with a 9.2 m$^2$ disk surface and 30-L capacity was used as the bioreactor. Initial test results indicated the 97% of the selenium was removed from the contaminated solution with a 4-hr retention time. Tests on other mining process waters using a bench scale RBC, *P. stutzeri*, a molasses-based nutrient (1.0 g/L), and a 6 hr retention time removed 97% of the selenium.

Example 11—Precipitate Analysis

Figure 9:
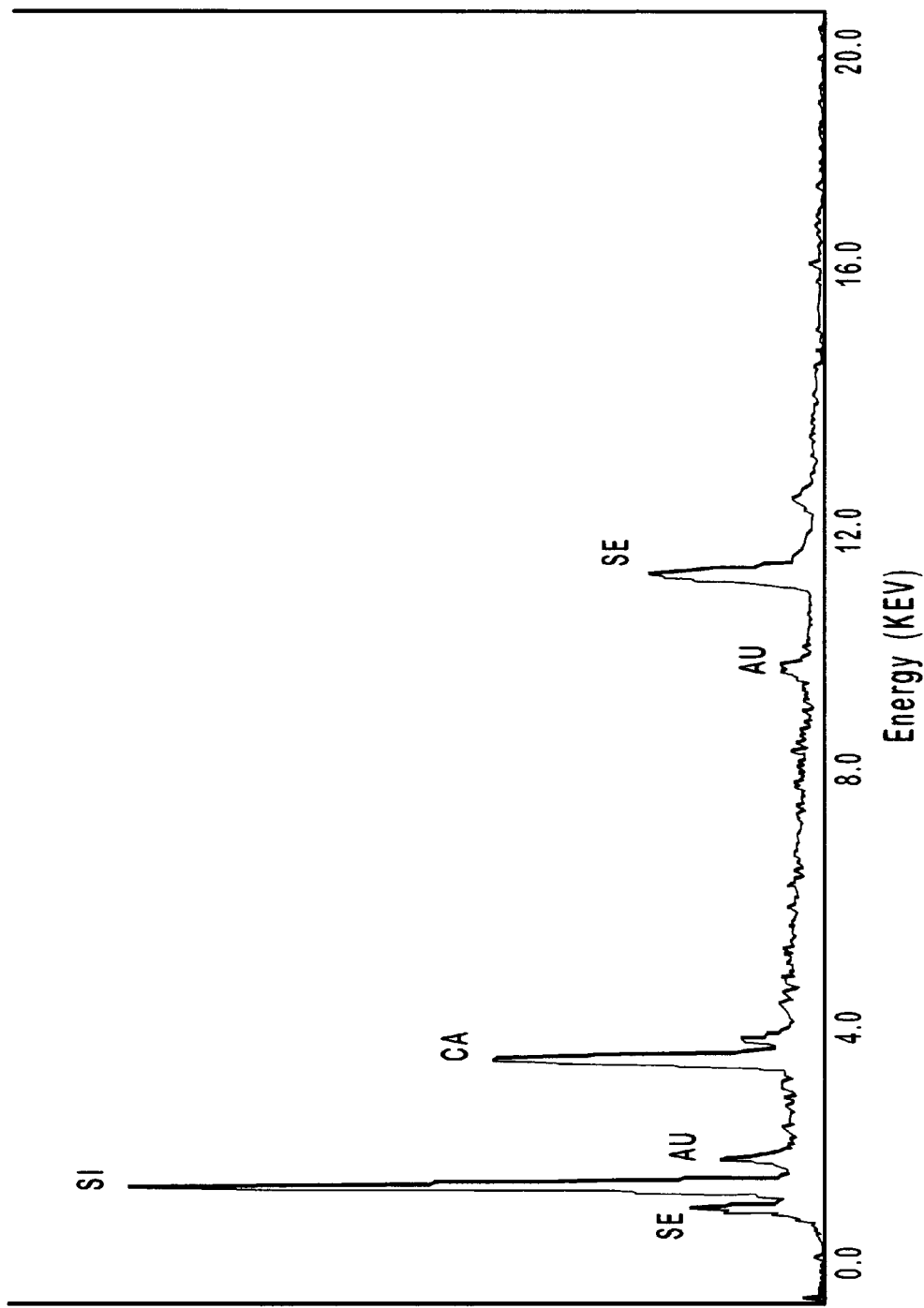
FIG. 9 is a spectrograph analysis of a b to reactor precipitate.

Referring to FIG. 9, the precipitate from the bioreactor is analyzed using a spectrometer. Depending on the mining water used and the oxygen content of the water, either red amorphous or dark brown to black crystalline selenium precipitates are formed. However, the dark brown to black crystalline selenium precipitates only have been noticed in systems with low dissolved oxygen and low redox readings. Preliminary SEM analysis of the selenium precipitates produced in reactors specifically configured for selenium reduction indicate a relatively pure selenium byproduct. SEM scans similar to FIG. 9 were obtained from immobilized live of *P. pseudoalcaligenes* and *P. stutzeri* used to treat complex mining waters containing uranium, copper, arsenic, and other metals. Selenium was the predominant metal/metalloid detected. Silicon is from the glass slide mount, and gold was deposited on the sample through the sputter-coating process. Calcium present in the sample is from the immobilization polymer. This preliminary data indicates the selectivity of these microbes and other naturally occurring microbes for selenium reduction in complex waters. Recovery of a high-purity selenium product from wastewaters could partially offset treatment costs.

From the above discussion, it will be appreciated that the present invention provides a cost effective method for using a bioreactor containing site specific microorganisms and nutrient for reducing and eliminating selenium contamination from water.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A site specific method for removing oxidized selenium from contaminated water comprising:

isolating endemic microbes from the selenium contaminated water;

screening the endemic microbes for selenium reduction and interference with selenium reduction;

selecting cultures of selenium reducing organisms;

optimizing the cultures for selenium reduction;

establishing a high density biofilm of the selenium reducing organisms within a reactor;

stabilizing the biofilm within the reactor;

providing nutrients to the organisms;

passing the selenium contaminated water through the reactor;

retaining the water in the reactor for a retention period;

precipitating reduced selenium from the water; and removing the reduced selenium from the water.

2. The method of claim 1, further comprising screening of known selenium reducing microbes for selenium reduction under site specific conditions.

3. The method of claim 2, wherein the known selenium reducing microbes comprise *P. stutzeri* and *A. xylososydans*.

4. The method of claim 1, wherein the endemic microbes comprise Pseudomonas species, Alcalaqine species, *E. coli*, and sulfate reducing bacteria.

5. The method of claim 1, wherein the removing comprises a solid liquid filtration step.

6. The method of claim 5, wherein the solid liquid filtration step comprises at least one of filtration, flushing, back flushing, hydrocycloning, tangential filtration, and agitation of a biofilm support matrix.

7. The method of claim 1, wherein the optimized cultures are selected based on contaminant reduction parameters and required nutrient amendments.

8. The method of claim 1, wherein the retention period is from about 4 hours to about 24 hours.

9. The method of claim 1, wherein the retention period is from about 4 hours to about 8 hours.

10. The method of claim 1, wherein the retention period is from about 12 to about 24 hours.

11. The method of claim 1, wherein the nutrients comprise at least one of sugar based nutrients, waste food based nutrients, molasses based nutrients, whey, protein mixes, yeast extract, and phosphate.

12. The method of claim 11, wherein the sugar based nutrients are present in a concentration ranging from about 0.25 g/L to about 5.0 g/L.

13. The method of claim 11, wherein the waste food based nutrients are present at a concentration ranging from about 0.25 g/L to about 5.0 g/l.

14. The method of claim 11, wherein the phosphate is present at a concentration ranging from about 25 mg/L to about 250 mg/L.

15. The method of claim 1, wherein the selenium is present as selenate and selenite.

16. The method of claim 1, wherein the reactor comprises at least two reactors connected in series.

17. The method of claim 1, wherein the reactor contains a matrix for establishing a biofilm thereon.

18. The method of claim 17, wherein the matrix comprises at least one of gravel, charcoal, pumice, microbe-containing agar based beads, a mixture of bio-solids, carbon/agar-based matrices, and a combination thereof.

19. A site specific method for removing oxidized selenium from contaminated water comprising:

isolating endemic microbes from the selenium contaminated water, the microbes selected from the group consisting of Pseudomonas species, Alcalaqines species, *E. coli*, and sulfate reducing bacteria.

screening the endemic microbes for selenium reduction and interference with selenium reduction;

selecting cultures of selenium reducing organisms;

optimizing the cultures for selenium reduction;

establishing of a high density biofilm of the selenium reducing organisms within a reactor, the reactor comprising a matrix for establishing a biofilm thereon;

stabilizing the biofilm within the reactor;

providing nutrients to the organisms, the nutrients comprising at least one of sugar based nutrients, waste food based nutrients, molasses based nutrients, whey, protein mixes, yeast extract, and phosphate;

passing the selenium contaminated water through the reactor;

retaining the water in the reactor for a retention period;

precipitating reduced selenium from the water; and removing the reduced selenium from the water.

20. The method of claim 19, wherein the removing comprises at least one of filtration, flushing, back flushing, hydrocycloning, tangential filtration, and agitation of a biofilm support matrix.

21. The method of claim 19, wherein the retention period is from about 4 hours to about 24 hours.

22. The method of claim 19, wherein the selenium is present as selenate and selenite.

23. A method of screening microbes for selenium reduction comprising:

isolating microbes from a selenium contaminated environment;

characterizing the isolated microbes;

incubating the microbes in a solution containing selenium;

analyzing the solution for selenium reduction.

24. The method of claim 23, further comprising the step of employing the screened microbes in a system comprising a bioreactor, a nutrient feed, and a solid liquid separation device for the removal of selenium from water.

25. The method of claim 24, wherein the bioreactor comprises a matrix for establishing a biofilm thereon.

26. The method of claim 23, wherein the characterizing comprising analyzing colony morphology and gram stain.

27. The method of claim 23, where in the solution contains nutrients to support microbial growth.

* * * * *